United States Patent Office 2,801,521
Patented Aug. 6, 1957

2,801,521

AXIAL THRUST BALANCED FLUID POWER TRANSMITTER

Joseph Jandasek, Brighton, Mich., assignor to Chrysler Corporation, Highland Park, Mich., a corporation of Delaware Application June 21, 1954, Serial No. 438,282

2 Claims. (Cl. 60—54)

This invention relates to fluid power transmitters and particularly to a means for controlling and/or varying the fluid pressure at certain locations within the power transmitter. In particular, this invention concerns means for producing suction and/or pumping effects within the transmitter as a result of the arrangement of porting along the path of the toroidal flow of fluid between the several converter rotor wheels during wheel rotation.

It is a primary object to provide porting means in the shell and/or web elements of fluid rotor wheels such that the porting will automatically vary the fluid pressure adjacent to the porting pierced rotor wheels.

It is another object of this invention to provide a porting arrangement for fluid rotor wheels whereby the forces resulting from pressure fluid in areas adjacent the rotor wheels may be readily varied.

Figure 1:
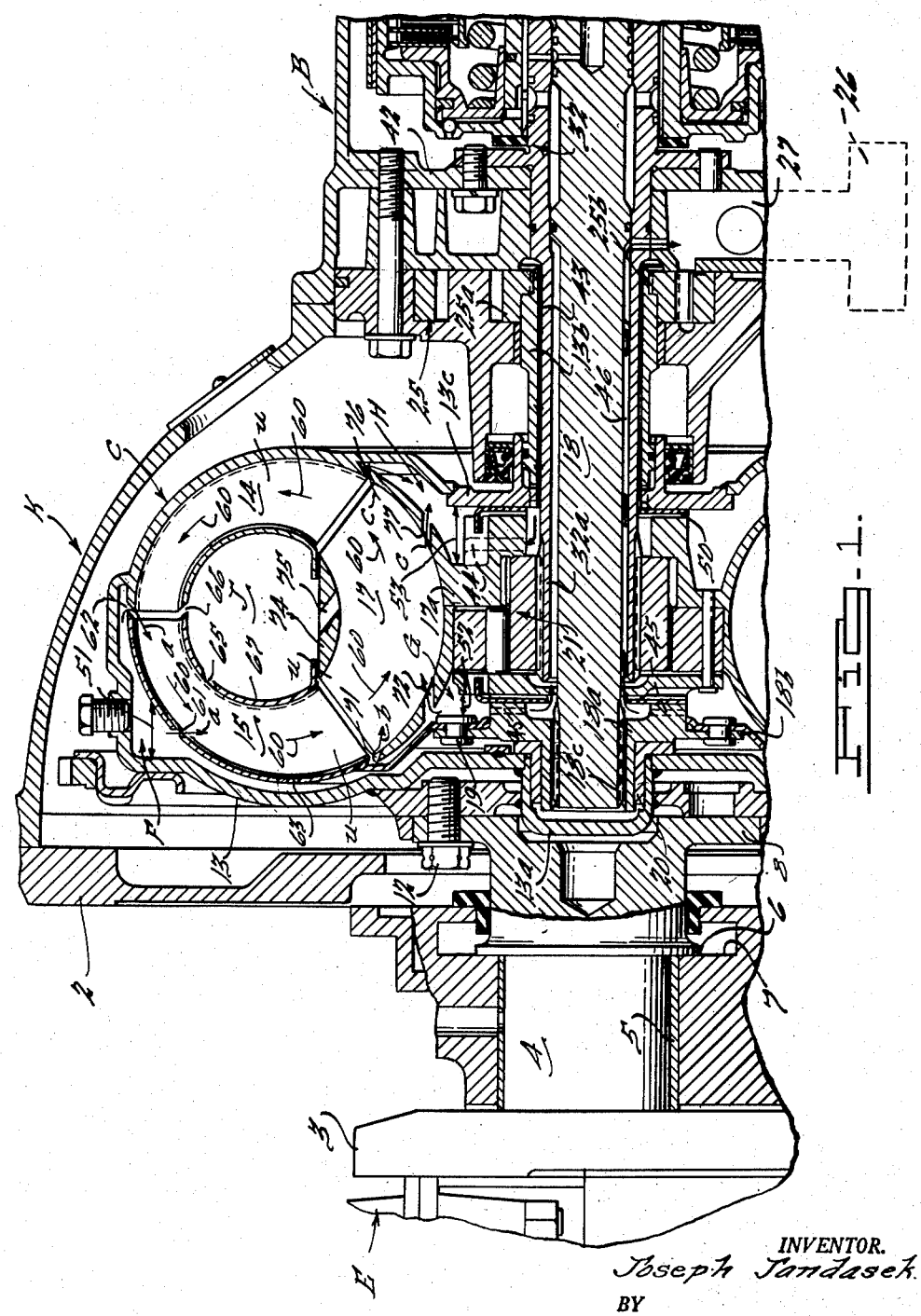
Figure 2:
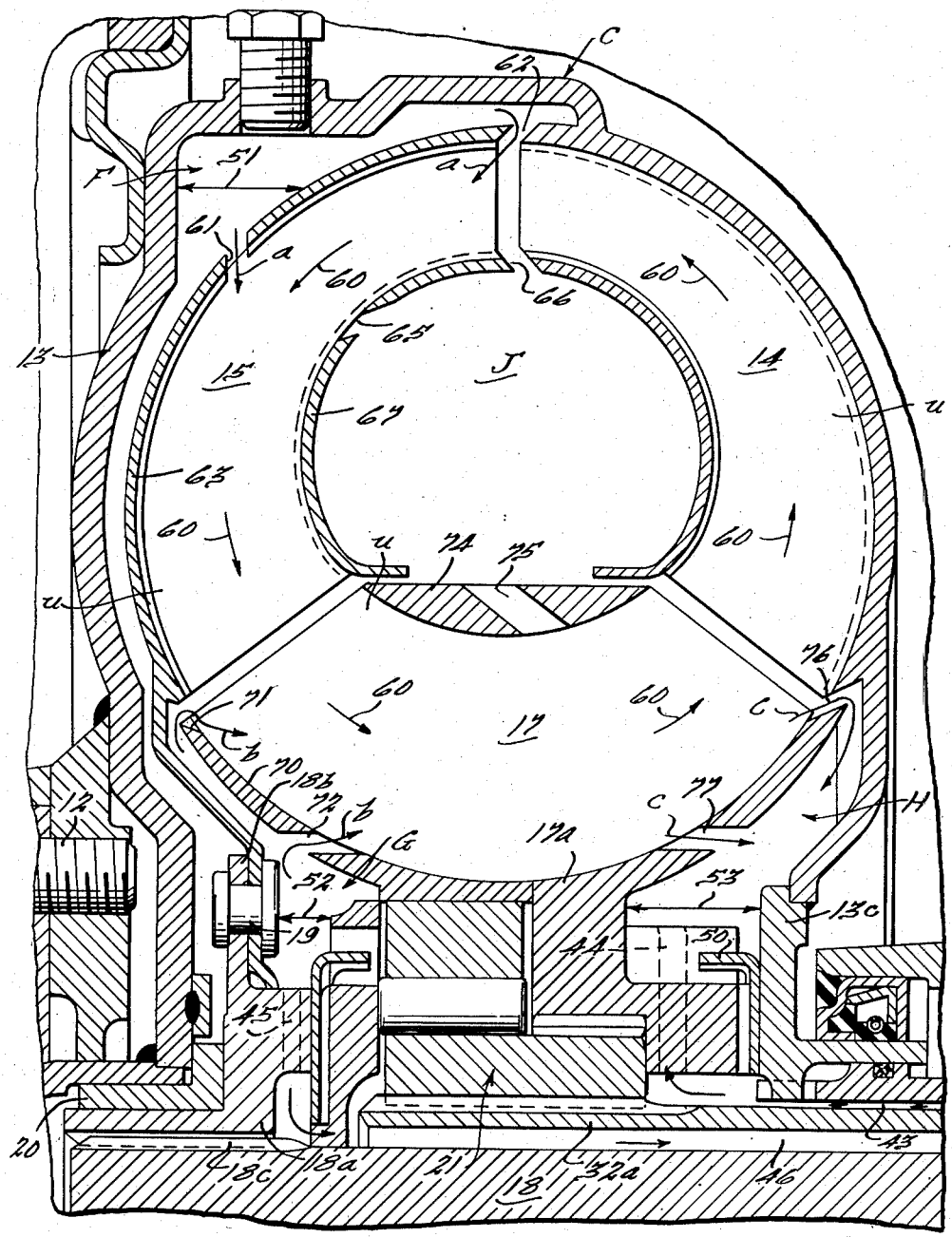

Other objects and advantages of this invention will be readily apparent from a reading of the following description and a consideration of the related drawings wherein:

Fig. 1 is a sectional elevational view of a portion of a drive train including a fluid power transmitter that embodies this invention; and Fig. 2 is an enlarged fragmentary view of a portion of Fig. 1 disclosing details of the fluid power transmitter embodying this invention.

Figure 1 of the drawings shows the rear portion of an internal combustion engine E that has mounted on its rear wall 2 the housing K of a torque converter unit C. The engine E includes a conventional crankshaft 3 that has its rear journal 4 supported in a rear crankshaft main bearing 5. The crankshaft rear journal 4 has a first radially extending thrust flange 6 that is adapted to bear against the portion 7 of the engine block and a second radially extending bolt connecting flange 8 that is adapted to be connected to the casing 13 of the torque converter unit C by the bolts 12.

The converter C comprises a fluid containing casing 13 in which are mounted the several vaned or bladed converter rotor wheel elements, namely, the impeller or pump member 14, the turbine or runner member 15, and the guide or reaction member 17. A pair of guide wheels may be used in place of the single guide wheel 17. The vaned impeller wheel 14 is formed as an integral part of the converter casing 13 and is accordingly adapted to be rotatably driven by the crankshaft 3. The vaned turbine wheel 15 is drivingly connected by rivet means 19 to a radially extending flange portion 18b formed on the shaft hub member 18a. Shaft hub member 18a is drivingly connected by splines 18c to the forward end portion of the intermediate driven shaft member 18. The intermediate shaft member 18 is adapted to transmit drive from the turbine member 15 of the torque converter unit C to the gearing (not shown) of the gear box unit B that is arranged rearwardly of and in series with the torque converter unit C. The forward end of intermediate shaft 18 is journalled in a bearing 20 that is piloted in an axially extending seat 13a formed in the hub of the torque converter casing 13. The intermediate portion of intermediate shaft 18 is rotatably supported by the sleeve bearing 32 that is mounted on the housing 42 of the gear box B.

The vaned guide wheel 17 is rotatably mounted within the converter casing 13 by means of the guide wheel hub portion 17a. Guide wheel hub portion 17a is supported by means of the one-way brake device 21, on the forwardly directed, axially extending sleeve portion 32a of the sleeve bearing 32. The one-way brake 21 (see Fig. 1) is arranged such that it will permit only forward rotary movement (clockwise when looking from the converter A towards the gear box B) to be transmitted to the guide wheel 17 by the converter fluid on forward rotation of the impeller 14. The brake 21 continuously prevents rotation of the guide wheel 17 in a reverse or counterclockwise direction.

The torque converter unit A includes a gear type oil pump 25 having a driving gear 25a that is directly connected by key means 25b to the rearwardly projecting end of an axially extending, sleeve-like, flange portion 13b of the rotatable converter casing 13. The pump 25 draws oil from a supply sump 26 through supply conduit 27 and discharges pressurized oil through the clearance passage 43 to the interior of the torque converter casing by way of suitable ports 44 through the guide wheel hub portion 17a. The pressurized fluid passed into converter casing 13 is circulated by the rotatable converter wheels in the manner shown by the arrows 60. Pressurized oil supplied to the torque converter casing is discharged therefrom through ports 45 and returned by way of passage 46 to the lube oil sump 26 so that it may be recirculated.

With fluid power transmission devices of the type here disclosed, there is frequently an unnecessary amount of wear at the crankshaft thrust flange 6 and at the thrust washer 50 that is located between the guide wheel hub portion 17a and the adjacent portion 13c of the converter casing 13. This accelerated wear is considered to result, at least in part, from pressure fluid generated, axially extending, forces resulting from the pressurizing of the converter casing interior. The casing 13 is pressurized by fluid from the pump 25 as well as by some inherent pressure build-up due to the pumping action of the converter wheel elements 14, 15, 17. It is believed that the three areas F, G, and H within the converter casing 13 are critical and normally have certain pressure conditions therein that tend to accelerate wear at the crankshaft thrust flange 6 and at the converter thrust washer 50.

Pressurized fluid in the area F of the converter interior exerts axially extending forces, as indicated by the arrowed line 51, against the casing 13 which forces tend to force the crankshaft thrust flange 6 against the journal portion 7. This increases wear at the thrust flange 6 as well as at other portions of the crankshaft bearing journal.

The area G within the converter casing 13 is, like area F, normally subjected to relatively high pressure fluid and this pressurized fluid exerts axially directed forces, as shown by the arrowed line 52, that tend to force the converter casing 13 and the attached crankshaft forwardly towards the engine E. The force of the pressurized fluid in area G thus supplements that developed by the pressurized fluid in area F and tends to increase the pressure between the crankshaft thrust flange 6 and the engine journal portion 7. The effect of the pressure fluid forces in area G, like area F, is to increase wear of the thrust flange 6 and associated crankshaft portions.

Not only do the pressure generated forces in areas F and G exert forwardly directed, axially extending, forces that tend to increase wear at the crankshaft thrust flange 6, but in addition, the forwardly directed, axially extending thrust applied to the converter casing 13 by these forces also tends to increase the pressure between the converter casing portion 13c and the thrust washer 50 and between the thrust washer 50 and the rear end of the guide wheel hub portion 17a. The increased pressure on the thrust washer 50 tends to increase wear at the location of the thrust washer 50. The fluid pressure generated forces in areas F and G not only increase the pressure on the thrust washer 50 and its adjacent elements, but these forces are supplemented by negative effects of the reduced pressure of the fluid in the area H adjacent the washer 50 as subsequently explained.

Due to the counterclockwise path of circulation of the converter fluid through the bladed or vaned power transmitting wheels 14, 15, 17 (see flow arrows 60) the area H is normally a low pressure area due to the ejector or suction effect of the fluid flowing from the guide wheel 17 into the impeller 14. The low pressure in area H tends to reduce the forces opposing the forwardly directed, axially extending thrust resulting from the forces of high pressure fluid in areas F and G and thus area H is not effective to balance the effects of high pressure areas F and G under normal circumstances.

The invention disclosed herein provides means whereby the fluid pressures in areas F, G, and H may be controlled and at least partially balanced so that the thrust forces at both the crankshaft thrust flange 6 and the converter thrust washer 50 are reduced in intensity with a consequent reduction in wear of both of these elements 6 and 50.

The converter unit C comprises three rotor wheels 14, 15, and 17 each of which is composed of an outer shell member, an inner web member and a plurality of radially extending blades or vanes $u$ which interconnect the associated shell and web members. Separate reference numerals have been applied to the several shell and web members to facilitate description of this invention.

As area F is normally a high pressure area the turbine 15 has openings or entrance ports 61 and 62 formed in its outer casing or shell portion 63 so that the circulation of converter fluid, as indicated by flow arrows 60, will develop an ejector or suction effect that will tend to withdraw fluid from and reduce the pressure of the fluid in area F. The ejector or suction ports 61, 62 may be in any portion of the wheel web that is adjacent the area F where the pressure is to be reduced. Ports 61 are shown in a central portion of the shell 63 whereas ports 62 are at an edge of the shell portion 63. These suction ports 61 and 62 slope at a diverging angle to the direction of flow of the converter fluid which is shown by the flow arrows 60. The ejector or suction ports 61 and 62 are thus trailing ports rather than leading ports for their angle is such that the flow of the converter fluid through wheels 14, 15, 17 tends to withdraw fluid from the area F through the ports 61, 62. The arrows $a$ represent the flow of fluid from the area F due to the suction or ejector effect of the circulating converter fluid.

In the event it is desired to reduce the pressure in the torus area J, located centrally of the wheels 14, 15, 17, then suction or ejector ports 65 and 66 may be formed in the interiorly located torus ring or web 67 of the turbine wheel 15. These ports 65 and 66 are trailing ports so that they tend to reduce the pressure in the torus area J. Obviously if it should be desired to build up the pressure in the torus area J then the angle of the ports 65, 66 could be reversed so that the circulating converter fluid could be pumped into torus area J during converter wheel rotation.

As the pressure in area G is normally high, whereas a reduced pressure is desired in this area, this invention proposes providing the shell portion 70 of the guide wheel 17 with suction or ejector ports 71 and 72 that will tend to suck the pressurized fluid from the area G during fluid flow. This effect is indicated by the arrows $b$. This suction effect of the ports 71 and 72 will reduce the pressure of the fluid in area G as previously explained. The ejector or suction ports 71 and 72 may be located at an edge of the shell portion 70 of wheel 17 or at some other location that is in contact with area G. These ejector ports 71, 72 are angled to provide trailing ports that diverge away from the direction of converter fluid flow so as to provide a suction effect. The torus shell 74 of the guide wheel 17 may have an ejector port 75 formed therein if it is desired to maintain a low pressure in the torus area J.

In addition to the ejector or suction ports 71 and 72 that are formed in the shell portion 70 of the converter guide wheel 17, there is also formed in the shell portion 70 of the guide wheel 17 one or more injector or fluid discharge ports 76 and 77. The injector or discharge ports 76 and 77 may be formed either at an edge of the shell of the wheel 17, as shown by port 76, or in an intermediate location, as shown by the port 77. The injector or discharge ports 76 and 77 are angled to be leading ports that converge towards the direction of flow of the converter circulating liquid. By this leading port arrangement some of the fluid circulating through the wheel 17 will be pumped into the area H through the injector or discharge ports 76, 77, as indicated by the arrows $c$, and the pressure in area H will be increased. Increasing the pressure in area H will reduce the thrust forces applied at washer 50 and cause at least a partial balance of the effect of the pressure fluid forces developed in the areas F and G. The arrowed line 53 indicates the effect of the pressure buildup developed in area H by the pumping of converter fluid into this area through the injector or discharge ports 76 and 77.

It is thought that the construction disclosed herein which utilizes injector and/or ejector porting in the rotatable shell and/or web portions of the wheels of a fluid power transmitter so as to control pressures and balance axially directed thrust forces developed in and by the rotatable fluid circulating wheels, is a novel advancement in this art. Obviously various other arrangements of the injector and ejector porting will be apparent from a reading of this description.

I claim:

1. In a fluid power transmitter, a support having a shaft receiving bore therein, a driving shaft journaled in said shaft bore having a radially extending flange bearing against said support to transmit axial thrust thereto in one direction, a driven shaft axially aligned with said driving shaft, a radially extending, pressure fluid filled, casing drivingly connected to said driving shaft, a plurality of vaned rotor wheels arranged within said casing so as to provide a closed toroidal circuit, one of said rotor wheels comprising an impeller that is drivingly connected to said casing, another of said rotor wheels comprising a turbine that is drivingly connected to said driven shaft and spaced from the interior of said casing so as to provide a first fluid chamber between the exterior of said turbine wheel and the interior of said casing, the pressure fluid in said first fluid chamber exerting a force on said casing that tends to thrust said driving shaft flange in said one axial direction, and another of said wheels comprising a stator rotatably mounted on a support and arranged so that exterior portions thereof are spaced from the interior of said casing so as to provide a second fluid chamber between the exterior of the stator and another interior portion of said casing, the second fluid chamber being positioned such that the pressure fluid therein exerts a force on the casing that tends to thrust said driving shaft flange in the other axial direction, porting piercing the exterior of said turbine wheel adjacent said first fluid chamber and converging towards the direction of fluid flow through the turbine wheel whereby during toroidal fluid flow a suction effect is applied to said first fluid chamber tending to reduce the pressure in said first fluid chamber, and other porting piercing the exterior of said stator adjacent said second fluid chamber and diverging from the direction of fluid flow through the stator whereby during toroidal fluid flow a pump effect is applied to said second fluid chamber tending to increase the pressure in said second fluid chamber.

2. In a fluid power transmitter as set forth on claim 1 wherein a thrust bearing extends between portions of said casing and said stator and is arranged such that the aforementioned fluid chambers and portings tend to reduce the thrust forces applied thereto.

References Cited in the file of this patent

UNITED STATES PATENTS

| | | |
|---|---|---|
| 2,271,919 | Jandasek | Feb. 3, 1942 |
| 2,407,497 | Jandasek | Sept. 10, 1946 |
| 2,453,877 | Trail | Nov. 16, 1948 |
| 2,602,295 | Anderson | July 8, 1952 |
| 2,678,537 | Stalker | May 18, 1954 |
| 2,717,673 | Ziedler | Sept. 13, 1955 |